United States Patent [19]

Allemand et al.

[11] Patent Number: 4,481,420

[45] Date of Patent: Nov. 6, 1984

[54] PROCESS FOR THE MANUFACTURING OF X-RAY DETECTORS FOR USE IN TOMOGRAPHY, RADIOGRAPHY, AND THE LIKE

[75] Inventors: Robert Allemand, Saint Ismier; Jean-Jacques Gagelin, Vinay; Edmond Tournier, Grenoble, all of France

[73] Assignee: Commissariat A L'Energie Atomique, Paris, France

[21] Appl. No.: 370,614

[22] Filed: Apr. 22, 1982

[30] Foreign Application Priority Data

May 6, 1981 [FR] France ............................... 81 09000

[51] Int. Cl.³ ............................................ G01T 1/185
[52] U.S. Cl. .................................................. 250/385
[58] Field of Search ............................ 250/385; 378/7

[56] References Cited

U.S. PATENT DOCUMENTS

| | | | |
|---|---|---|---|
| 3,937,965 | 2/1976 | Vasseur | 378/7 |
| 4,031,396 | 6/1977 | Whetten et al. | 250/385 |
| 4,047,041 | 9/1977 | Houston | 250/385 |
| 4,055,767 | 10/1977 | Allemand | 250/385 |
| 4,161,655 | 7/1979 | Cotic et al. | 250/385 |

FOREIGN PATENT DOCUMENTS

| | | |
|---|---|---|
| 2410289 | 6/1979 | France . |
| 12065 | 6/1980 | France . |

*Primary Examiner*—Janice A. Howell
*Assistant Examiner*—Constantine Hannaher
*Attorney, Agent, or Firm*—Pearne, Gordon, Sessions, McCoy, Granger & Tilberry

[57] ABSTRACT

The invention relates to a process for making a multidetector of X-rays forming a plane beam. This multidetector comprises a tight chamber filled with an ionizable gas and, in this chamber, at least one main multidetector assembly comprising a plane conducting plate, electrically insulated from the chamber and a plurality of flat electrodes parallel to the plate, insulated from this plate. This process is characterized in that it consists in making the electrodes, as well as main connections between these electrodes and measuring points outside the chamber enabling the currents circulating respectively in these electrodes to be sampled, on a main face of an electrically insulating plate, these main connections being electrically insulated from the chamber and passing therethrough in tight manner, opposite the source which emits the X-rays. The invention is more particularly applicable to X-ray multidetectors intended for the tomography or radiography of organs or for checking baggage.

6 Claims, 6 Drawing Figures

PROCESS FOR THE MANUFACTURING OF X-RAY DETECTORS FOR USE IN TOMOGRAPHY, RADIOGRAPHY, AND THE LIKE

The present invention relates to a process for making an X-ray multidetector and particularly one for detecting X-rays which have passed through an object and/or an organ after having been emitted by a source emitting in the direction of the object or the organ, these X-rays being in the form of a plane beam having a wide angular aperture and of small thickness. This invention is more particularly applied to the manufacture of multidetectors intended for the tomography or radiography of organs, but also for industrial checking, such as the checking of luggage, for example.

It is known that, in these applications, the X-ray multidetectors make it possible to measure the absorption of a beam of X-rays passing through an object or an organ, this absorption being associated with the density of the tissues of the organ examined or with the density of the materials constituting the object studied.

If it is desired to draw up the density chart of an organ or an object, it is possible, and known, to send a plane beam of incident X-rays onto this object or organ, this beam having a wide angular aperture and being of small thickness, and to observe the corresponding absorption for each position of the beams of incident X-rays with respect to the object or organ. A multiplicity of scannings in crossing directions makes it possible to know, due to the X-ray multidetector, after an appropriate digital processing of the signals collected on the cells of the detector, the value of the absorption of the X-rays at one point of the plane of section considered, and thus to know the density of the tissues of the organ or the density of the materials constituting the object.

A first type of X-ray multidetectors employing ionization and used in radiography and in tomography is multicellular and comprises cells defined by conducting plates perpendicular to the plane of the beam of X-rays and taken alternately to positive and negative potentials. These cells are located in a tight chamber containing an ionizing gas. The advantages of this type of multidetector are as follows: it allows a good collimation of the X-rays when the plates used in the detection cells are constituted by a very absorbent material; the time for collection of the charges resulting from ionization of the gas by the X-rays is very short due to the small spacing of the conducting plates and the good separation between the detection cells. However, this type of multidetector presents considerable drawbacks: it is very difficult to manufacture and is consequently expensive. Moreover, if it is desired to reduce the thickness of the plates in order to increase the quantity of X-rays detected, there is reduction in collimation due to the small thickness of the plates; this small thickness of the plates further provokes a considerable microphony. Finally, the multidetectors of this type, as indicated hereinabove, are very complex to produce, leading to high manufacturing costs; they require assembly in a dedusted room, as any dust on one of the plates may provoke starting or deterioration of the leakage current between two consecutive plates. Added to these drawbacks is the fact that the numerous electrodes used require numerous electrical connections, inside the tight chamber, which raises difficult problems of reliability of the welds of the connections on the electrodes.

A second type of multidetector is known which has a much simpler structure, but which is not perfect. This other type of multidetector comprises a tight chamber containing a gas ionizable by rays issuing from the organ or the object and, in this chamber, a plate for collecting the electrons resulting from ionization of the gas; this plate is parallel to the plane of the beam of incident rays and it is taken to a positive high voltage. A series of electrodes for collecting the ions resulting from ionization of the gas by the X-rays issuing from the object is disposed parallel and opposite the preceding plate; these ion collecting electrodes are taken to a potential close to 0 and are directed towards the source which emits the X-rays, in the direction of the object. They are located in a plane parallel to the plane of the beam of incident rays and furnish respectively a measuring current as a function of the quantity of ions obtained by ionization of the gas opposite each electrode, under the effect of the rays issuing from the object or the organ, in a direction corresponding to that of the incident rays.

This type of multidetector presents certain advantages: there are no longer any separation plates, as in the multidetector mentioned hereinbefore; this eliminates any undesirable phenomenon of microphony. Due to the elimination of these separation plates, the quantity of X-rays detected is maximum; this type of multidetector is more simple to produce and it is hardly sensitive to dust. Finally, it is possible, without connection inside the tight chamber, to collect, inside the chamber, the signals available on each of the electrodes taken to a potential close to 0.

However, this type of multidetector presents a further serious difficulty in manufacture as the electrodes are connected to measuring points outside the chamber, by connections which require welds on these electrodes, inside the chamber. These welds are very difficult to make and the passage of these connections through the chamber raises problems of tightness and electrical insulation, which are very difficult and very expensive to solve.

It is an object of the present invention to overcome this drawback and in particular to manufacture a multidetector of this second type, simply and inexpensively, without welds on the electrodes inside the chamber to connect them, by connections, to points outside the chamber.

The invention relates to a process for making an X-ray multidetector adapted to detect in particular the X-rays having passed through an object or an organ, these rays being furnished by a source emitting a plane beam of X-rays of small thickness, this multidetector comprising a tight chamber filled with an ionizable gas, and in this chamber, at least one main multidetector assembly comprising a plane conducting plate, electrically insulated from the chamber, parallel to the beam of X-rays and taken to a first level of potential, and a plurality of flat electrodes parallel to the plate, electrically insulated from said plate, said electrodes being insulated from one another, taken to a second level of potential and extending in the direction of the rays furnished by the source, said process being characterised in that it consists in making the electrodes, as well as main connections between these electrodes and points of measurement outside the chamber enabling the currents circulating respectively in these electrodes to be sampled, on a main face of an electrically insulating plate, these main connections being electrically insulated from the chamber and passing therethrough in tight manner, opposite the source of X-rays to be detected.

According to another feature of the process, at least one other secondary multidetector is made, whose structure is identical to that of the main multidetector assembly, the plate of this secondary multidetector being taken to a third level of potential and the electrodes being taken to a second level of potential, the electrodes of this secondary multidetector as well as respective connections between these electrodes and secondary points outside the chamber being made on a secondary face of the electrically insulating plate, opposite the main face, these secondary connections being electrically insulated from the chamber and passing therethrough in tight manner opposite the source of X-rays, the process then consisting in respectively connecting the main and secondary connections. According to another feature, the electrodes and the connections are made in the form of conducting deposits on the insulating plate. These conducting deposits are preferably engraved, metallized deposits.

The invention also relates to a process for making multidetectors of X-rays belonging to a plane beam, wherein the tight chamber is constituted by at least one electrically insulating plate carrying the electrodes and the connections between these electrodes and the outside points of measurement, at least one conducting plate, and at least one electrically insulated spacer whose hollow interior forms said chamber and separating the two insulating and conducting plates.

This process of manufacture obviously further enables a structure to be made incorporating main multidetector and secondary multidetector, the two chambers defined by two plates and a spacer being superposed and filled with an ionizable gas; it also enables a superposition of multidetectors to be made, either of single structure, or of double structure (main multidetector and secondary multidetector), making it possible to analyse simultaneously a plurality of juxtaposed parallel plane beams.

Finally, the invention relates to an X-ray multidetector obtained according to the process described hereinabove.

The invention will be more readily understood on reading the following description with reference to the accompanying drawings, in which:

FIG. 1 schematically shows a multidetector of known type, which may be manufactured according to the process of the invention.

FIG. 2 is a front view of the multidetector of FIG. 1.

FIG. 3 schematically shows a multidetector of another known type, which may be manufactured according to the process of the invention.

Figure 1:
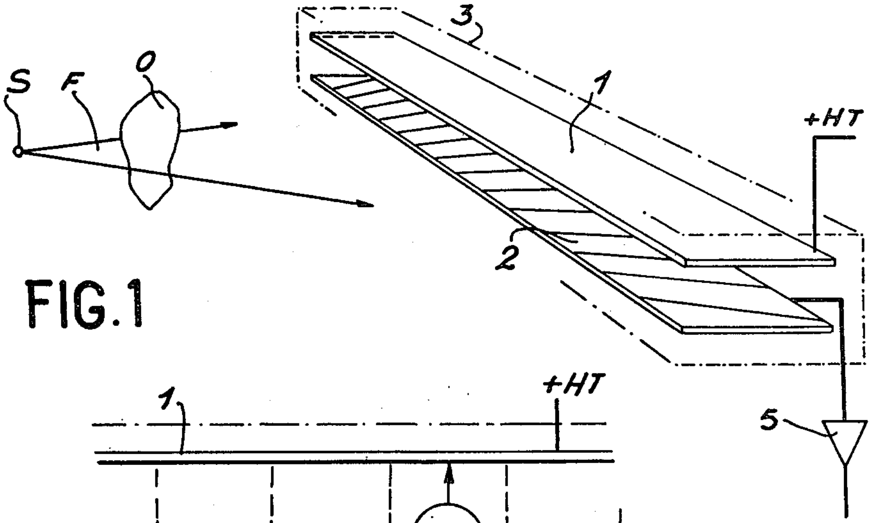

Referring now to the drawings, FIG. 1 schematically shows, in perspective, a multidetector which may be made according to the process of the invention. This multidetector comprises a plate 1 taken to a first level of potential (positive high voltage +HT) and, opposite, a series of electrodes 2 taken to a second level of potential (close to 0 volt). This plate and these electrodes are located in a main tight chamber 3, shown schematically, and which contains at least one ionizable gas, such as xenon for example. This multidetector makes it possible to detect the X-rays which have passed through an object or an organ O, these rays being furnished by a pin-point or linear source S which emits towards the object or the organ a plane beam F of incident X-rays. This beam has a wide angular aperture and is of small thickness. The plate 1 is parallel to the plane of the beam of incident rays, whilst the flat electrodes 2 are located in a plane parallel to the plane of the beam of incident rays, opposite the plate 1. The plate 1 which is taken to a positive potential of some kilovolts, is an electron collecting plate, whilst the electrodes 2 are ion collecting electrodes. These electrodes are generally supported by an insulating plate (not shown in this Figure) and are electrically insulated from one another. The pressure of the xenon inside the tight chamber has a value which is a function of the energy of the X-radiation to be detected (from about 1 to 40 bars); this gas may, moreover, be supplemented by other gases intended to improve detection. The electrodes 2 form bands converging in the direction of the source S.

Figure 2:
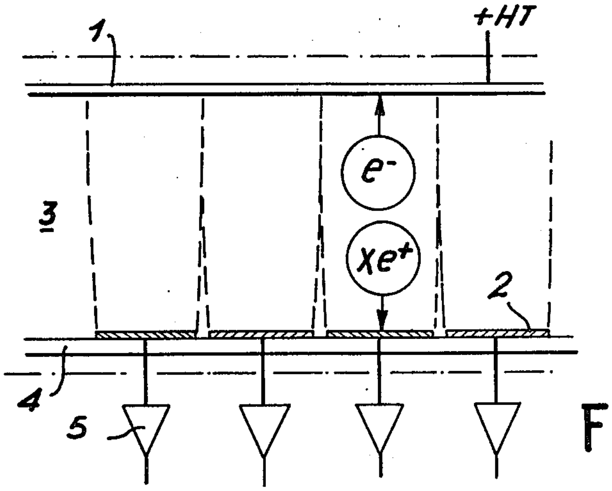

FIG. 2 schematically shows a front view of the preceding detector. This Figure shows the plate 1 taken to a positive potential +HT as well as the electrodes 2 taken to a potential close to 0 volt; these electrodes are supported by an electrically insulating plate 4 and each is connected to an amplifier 5 which makes it possible to sample the current circulating in each of the electrodes; these currents are applied to a processing and display system (not shown) which displays the body or the object O traversed by the X-rays emitted by the source S. In this Figure, the vertical broken lines represent the lines of field. In the chamber 3 containing at least xenon, $Xe^+$ represents the positive ions of xenon which are directed towards the electrodes 2 and $e^-$ the electrons which are directed towards the plate 1, these ions and electrons resulting from ionization of the xenon by the X-rays issuing from the object or organ O. In the case of adding an electronegative gas, the electrons are replaced by the negative ions, formed from the additional gas.

According to the invention, the process for manufacturing this multidetector consists in making the electrodes 2, as well as main connections between these electrodes and points outside the chamber, enabling the currents circulating respectively in these electrodes to be sampled, on a main face of an electrically insulating plate 4. These connections are shown more completely in FIGS. 5 and 6. These main connections are electrically insulated from the chamber and pass therethrough in tight manner, opposite the source.

Figure 3:
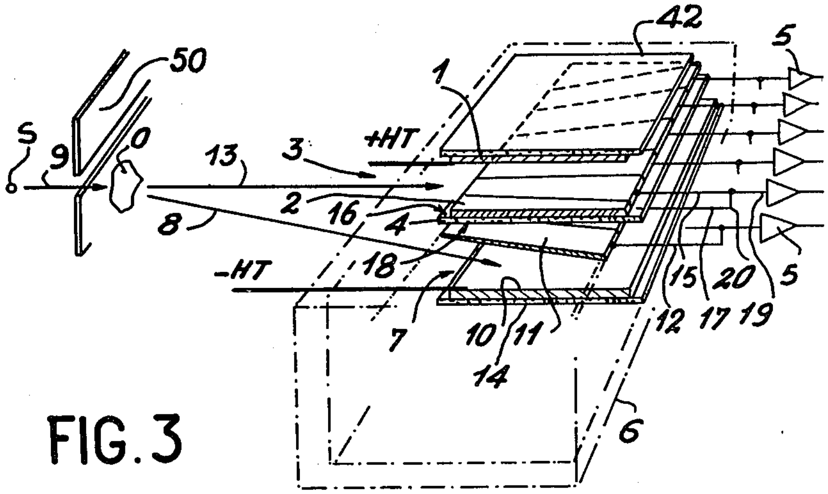

FIG. 3 schematically shows, in perspective, another multidetector obtained according to the process of the invention. This multidetector comprises a tight chamber 6, made of metal for example, containing at least one ionizable gas such as xenon for example. This chamber is subdivided into two ionization chambers: a main ionization chamber 3 and a secondary ionization chamber 7. The main ionization chamber 3 contains, like the multidetector of FIG. 1, a plate 1 taken to a first level of potential (positive high voltage +HT) and a series of electrodes 2 taken to a second level of potential (close to 0 volt). The plate 1 and the electrodes 2 in the main ionization chamber 3 form a main multidetector assembly. As before, these electrodes are flat and are supported by an electrically insulating plate 4; the plate 1 as well as the electrodes 2 are located in a plane parallel to the plane of the beam of X-rays issuing from the object O (this beam not being shown completely in the Figure). The electrodes 2 converge in the direction of the source S. Each of the electrodes 2 of the main ionization chamber 3 is connected to an amplifier 5 which makes it possible to sample, with a view to processing, the current circulating in each of these electrodes. The secondary ionization chamber 7 is coupled to the main chamber to compensate the scattering current coming from the X-rays diffused by the organ O. In fact, as will be seen hereinafter in detail, the electrodes 2 of the main ionization chamber 3, respectively furnish a current I which is the sum, on the one hand, of a measuring current $I_M$ proportional to the quantity of ions obtained by ionization of the gas opposite each electrode of the main ionization chamber under the effect of the rays issuing from the object, in directions corresponding to that of the incident rays 9, and of a scattering current $I_D$ resulting from ionization of the gas by the rays 8 diffused, in particular by the object, in directions other than that of the incident rays. The secondary ionization chamber 7 contains, like the main ionization chamber, a plate 10 parallel to the plane of the beam of incident X-rays, taken to a third level of potential (negative high voltage −HT), as well as a series of flat electrodes 11, parallel to the plane of the beam of incident X-rays, and located on another face of the insulating plate 4 which supports the electrodes 2 of the main ionization chamber 3. The plate 10 and the electrodes 11 in the secondary chamber 7 form a secondary multidetector assembly. The electrodes 11 are taken, like the electrodes 2 of the main ionization chamber, to a potential close to 0. They are respectively connected by connections 12 to the corresponding electrodes of the main ionization chamber 3. The electrodes 11 of the secondary ionization chamber and the electrodes 2 of the main ionization chamber are preferably identical and located opposite one another. The secondary ionization chamber 7 makes it possible, as will be seen hereinafter in detail, to compensate, for subsequent processing of the currents issuing from the amplifiers 5, the diffused currents which circulate in each electrode of the main ionization chamber and which come from the X-rays diffused by the object or the organ O. The electrodes 11 of the secondary ionization chamber 7 are electrodes for collecting the electrons e− or negative ions, whilst plate 10 is a plate for collecting the ions Xe+ coming from ionization of the xenon contained in the secondary chamber 7, by the X-rays diffused by the object or organ O. The electrodes of the secondary ionization chamber are preferably located opposite the electrodes of the main ionization chamber and the positive and negative high voltages have the same absolute value. Reference 50 designates a diaphragm.

Figure 4:
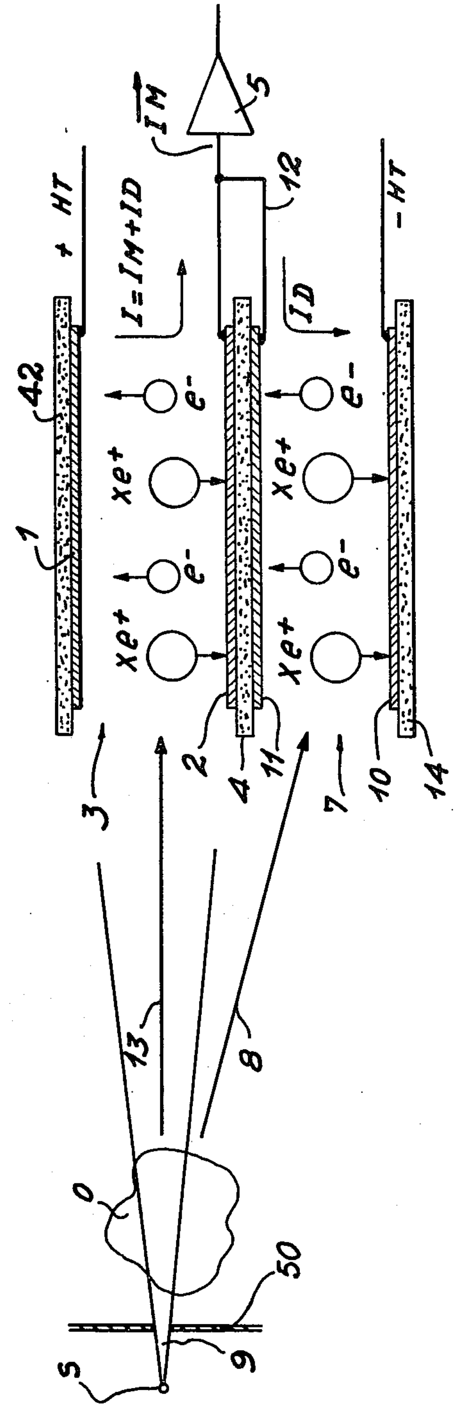
FIG. 4 is a side view of the multidetector of FIG. 3.

FIG. 4 schematically shows a lateral view of the preceding multidetector. This views shows the source S, the object or organ O, one of the rays 9 emitted by the source S and, leaving the object O, the direct ray 13 issuing from the object O, in the same direction as the incident ray 9; this Figure also shows one of the diffused rays 8, issuing from the object O, in a direction different from the direction of the incident ray 9. The Figure shows one of the electrodes 2 of the main ionization chamber which is connected to an amplifier 5 and which is taken to a potential close to 0, and one of the electrodes 11 of the secondary ionization chamber 7, which is located opposite the electrode 2 and which is separated from said electrode by the insulating plate 4. Also shown is the connection 12 between the electrodes of the main and secondary ionization chambers. Finally, the plates 1 and 10 of the main and secondary ionization chambers are shown, taken respectively to positive and negative potentials +HT and −HT. The tight chamber 6 which contains the ionizable gas has not been shown in detail; the insulating plates 42,14 support the conducting plates 1, 10 of the main and secondary ionization chambers. When the ionizable gas is xenon, the X-rays represented at 13 and which issue from the object, in the direction of the incident rays 9, arrive between the electrodes 2 and the plate 1 of the main ionization chamber; ionization of the xenon is then produced between these electrodes and this plate. This ionization is schematically represented in the Figure by ions Xe+ which are attracted by the electrodes 2, and by electrons e− or negative ions which are attracted by the positive plate 1. Ionization is thus produced opposite each of the electrodes of the main ionization chamber due to the X-rays issuing from the object, in the direction of the incident rays. These movements of ions produce respectively in each electrode a current I which is the sum of a current $I_M$ resulting from ionization of the gas opposite each of the electrodes, under the effect of the X-rays issuing from the object (rays represented at 13 in the Figure), in a direction corresponding to that of the incident rays, and of a scattering current $I_D$, which results from ionization of the gas, opposite each of the electrodes, from the rays diffused by the object, in directions which do not correspond to those of the incident X-rays. The ionization chamber 7 makes it possible to compensate this scattering current, due to the ionization produced in this chamber by the diffused X-rays 8; this ionization provokes the circulation, in the electrodes 11 of the secondary chamber, of a current $I_D$ which, due to the connection 12, cancels out the parasitic scattering current taken into account by the electrodes of the main ionization chamber. The amplifiers 5 connected to each of the electrodes of the main and secondary ionization chambers thus receive a current $I_M$ which is effectively the measuring current corresponding to the ionization of the gas, provoked opposite each of the electrodes of the main ionization chamber, by the rays 13 issuing from the object or the organ, in the directions which correspond to those of the incident rays 9.

According to the invention, the process for manufacturing this multidetector consists, as for the multidetector of FIG. 3, in making on a main face 16 of the electrically insulating plate 4, the electrodes 2 as well as the main connections 15 between these electrodes and the measuring points 19 outside the chamber; these measuring points make it possible to sample the currents circulating respectively in these electrodes; the main connections 15 are electrically insulated from the chamber and pass therethrough in tight manner, opposite the source. The process then consists in making at least the other secondary multidetector assembly, whose structure is identical to that of the main multidetector assembly; the plate 10 of this secondary multidetector is taken, as has been indicated hereinabove, to a negative high voltage and the electrodes 11 are taken to a potential close to 0. The electrodes 11 of this secondary multidetector, as well as respective connections 17 between these electrodes 11 and secondary points 20, outside the chamber, are made on a secondary face 18 of the electrically insulating plate 4; this secondary face 18 is opposite the main face 16; the secondary connections 17 are electrically insulated from the chamber and pass therethrough in tight manner, opposite the source S; the process then consists in connecting respectively the measuring point 19 and the secondary points 20.

The electrodes and connections are made in the form of conducting deposits on the insulating plate; these conducting deposits are preferably metallized deposits engraved on the insulating plate. As will be seen hereinafter in detail, the conducting plates 1 and 7 are taken respectively to a positive voltage +HT and to a negative high voltage −HT, making a connection between each of these plates and a source of high voltage outside the chamber; this connection is electrically insulated from the chamber and passes therethrough in tight manner.

Figure 5:
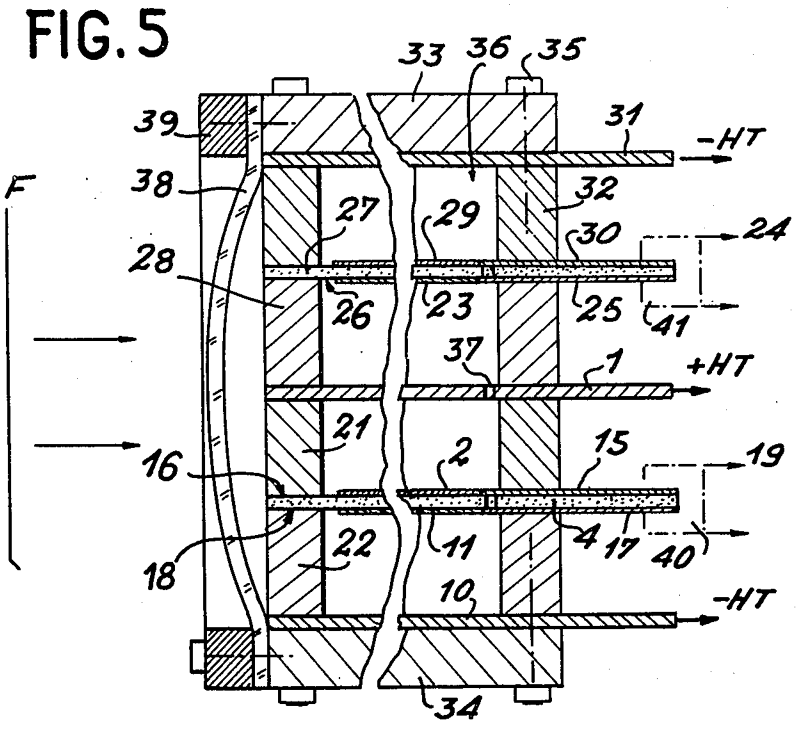
FIG. 5 is a schematic view in lateral section of a multisection multidetector, with operation comparable to that of the multidetector of FIG. 3, and which can be manufactured according to the process of the invention.

FIG. 5 is a schematic view, in lateral section, of a multisection multidetector, whose functioning is comparable to that of the multidetector of FIG. 3; this multidetector is made according to the process of the invention, by stacking a plurality of main and secondary multidetector assemblies such as described in FIG. 3.

The multidetector of FIG. 5 is a stack of main and secondary multidetectors as described in FIG. 3. This stack comprises a first main multidetector assembly comprising a plane conducting plate 1 adapted to be taken to a positive high voltage +HT, electrically insulated from the chamber (the latter may be constituted for example by epoxy resin). This plane conducting plate is parallel to the beam F' of X-rays issuing from the object or organ to be analysed (not shown in this Figure). This first multidetector assembly also comprises a plurality of flat electrodes 2 parallel to the plate 1 and extending in the direction of the X-rays of beam F'. These electrodes are insulated from one another as will be seen in detail hereinafter, and are taken to a potential close to 0. These electrodes, as well as main connections 15 between these electrodes and measuring points 19 outside the chamber making it possible to sample the currents circulating respectively in these electrodes, are made on a face 16 of the electrically insulating plate 4. These main connections 15 are electrically insulated from the chamber and pass therethrough in tight manner, opposite the source which emits the beam F' of X-rays. The chamber containing an ionizable gas is here constituted by the insulating spacer 21, of epoxy resin for example, of which the hollow interior forms a chamber; this spacer makes it possible to separate the electrodes 2 and the plate 1 and the chamber may contain xenon for example. The covers 33 and 34 are provided to be made of aluminium alloy, but the plates 10 and 31 are identical to plates 1, 15 and 10, 14 of FIG. 4. The covers 33, 34 may possibly abut in tight manner on the plate 1 and on the insulating plate 4, to form with the electrodes 2 an elementary multidetector whose front face would be provided with a tight window 38.

According to the invention, at least one other secondary multidetector is made, whose structure is identical to that of the main multidetector assembly which has just been described. The plate 10 of this secondary multidetector is taken to a negative high voltage −HT, whilst the electrodes 11 of this multidetector, whose structure is identical to that of the electrodes 2 of the main multidetector, are taken to a potential close to 0. The electrodes 11 as well as the respective connections 17 between these electrodes and secondary points outside the chamber formed by the spacers 21, 22, are made on the other face 18 of the electrically insulating plate 4. The secondary connections 17 are electrically insulated from the chamber, the latter being made of epoxy resin, for example; these connections pass through the chamber formed by the spacers 21, 22 in tight manner, opposite the source emitting the beam F' of X-rays. The process then consists in connecting the main and secondary connections 15 and 17 respectively to the measuring points 19, for each of the electrodes, by a connector 40, shown schematically in the Figure. If the hollow spacers 21, 22 are closed by covers 33, 34 abutting tightly on the plates 1 and 10, a multidetector is obtained whose structure is comparable to that of FIG. 3; this multidetector makes it possible, due to the secondary assembly, as has been monitored hereinabove, to compensate the scattering current present in the current sampled at each of the electrodes. In order to make a multisection multidetector, another stack comparable to the stack which has just been described may also be made. This other stack comprises a main multidetector formed by the plate 1 taken to positive high voltage and ion collecting electrodes 23, taken to a potential close to 0, connected to measuring points 24, by main connections 25; the electrodes 23 and the main connections 25 are made, as previously, on a face 26 of an electrically insulating plate 27. The electrodes 23 and the plate 1 are separated by a hollow insulating spacer 28. In the same way as for the preceding stack, a secondary multidetector is formed on the other side of the insulating plate 27. This secondary multidetector comprises electrodes 29 taken to a potential close to 0. These electrodes are insulated from each other and directed towards the rays of the beam F'. They are connected respectively by secondary connections 30 to outside points. This secondary multidetector assembly also comprises a plate 31 taken to a negative high voltage −HT and separated from the electrodes 29 by an insulating spacer 32; the different spacers, electrodes and plates of this stack are rendered fast by covers 33, 34 and provided with fixing means 35; the covers, spacers, plates and connections, as well as the plates supporting the electrodes, are rendered fast so that the assembly forms a tight, hollow volume 36, containing xenon for example. The different chambers formed in this hollow volume may be placed in communication by openings such as 37 made in the plates supporting the electrodes and in the plate 1 taken to positive high voltage +HT. The electrodes 29 and the plate 31 of the secondary chamber of the second stack, form a chamber for compensating the scattering currents which disturb the currents measured on the electrodes 23 of the main chamber of this second stack. To this end, the connector 41 makes it possible to connect electrodes 23 and 29 of this second stack to the measuring points 24. In order to ensure solidity and tightness of the device which contains xenon for example, at a pressure greater than 10 atmospheres, a tight window 38, held by a collar 39, is disposed on the front face of the multidetector.

It is obvious that the detector shown in this Figure comprises two stacks which enable two parallel sections of an organ or an object to be analysed, to be made; this multidetector may comprise one stack only or more than two stacks. It is also obvious that each multidetector does not necessarily comprise the chamber compensating the scattering currents; in fact, the invention is directed to the production of the electrodes and their connections with outside points, these electrodes and these connections being made in the form of conducting deposits on an insulating plate. These deposits are metallized and engraved on the insulating plate.

The invention is also and especially directed to the manufacture of a multidetector by stacking such insulating plates equipped with conducting deposits and insulating spacers, this stack forming the insulating chamber filled with detector gas.

Figure 6:
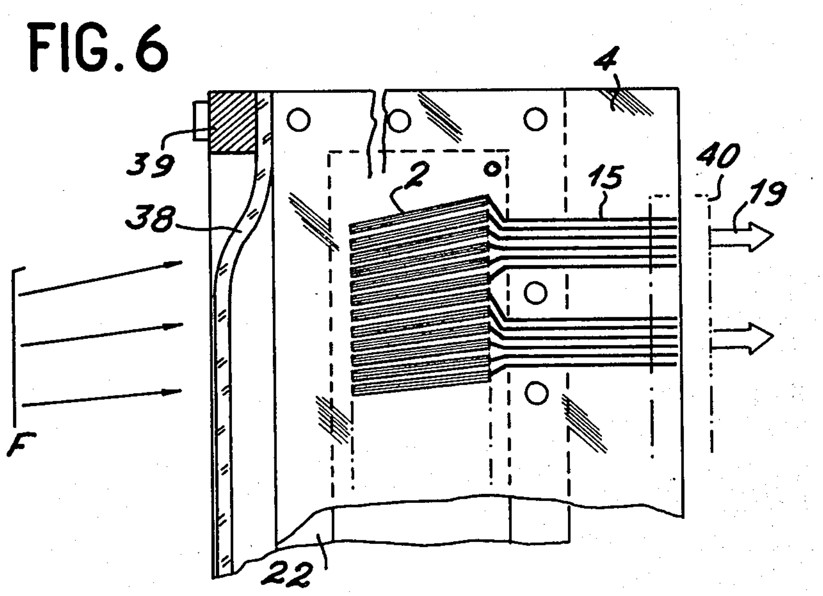
FIG. 6 is a schematic plan view of the electrodes of the multidetector of FIG. 5.

FIG. 6 is a plan view of the detector of FIG. 5, in section made at the level of plate 4, for example. This Figure shows the electrodes 2 directed towards the rays of the beam F′ of X-rays and the main connections 15 between these electrodes and measuring points 19 outside the multidetector. This Figure also clearly shows that the electrodes 2 and the connections 15 are made in the form of conducting deposits on the insulating plate 4. It is obvious that the electrodes 11, 23 and 29 are made in the same manner.

The plates and electrodes of the main and secondary ionization chambers of each stack are preferably made in the form of a copper deposit on an insulating support.

By way of indication, the number of cells of each chamber may be greater than 500, for an angle of aperture of the beam of X-rays greater than 40°; in this case, the pitch between each of the electrodes of each chamber is about 1 mm. The insulating plate which supports the electrodes of the main and secondary chambers is preferably located half-way between the plates which are respectively taken to positive and negative potential. The distance between these plates is about 14 mm and the time for collecting the ions is about 10 ms.

What is claimed is:

1. Process for making an X-ray multidetector arranged to detect a plane beam of X-rays of small thickness, said multidetector comprising a tight chamber filled with an ionizable gas, and in this chamber, at least one main multidetector assembly comprising a plane conducting plate, electrically insulated from the chamber, parallel to the beam of X-rays and taken to a first level of potential, and a plurality of flat electrodes parallel to the plate, insulated from this plate, said electrodes being insulated from one another, taken to a second level of potential and extending in the direction of the rays furnished by the source, said process comprising the step of making the electrodes as well as main connections between these electrodes and points of measurement outside the chamber enabling the currents circulating respectively in these electrodes to be sampled, on a main face of an electrically insulating plate, these main connections being electrically insulated from the chamber and passing therethrough in tight manner, opposite the source which emits the X-rays.

2. The process of claim 1, wherein it consists in making at least one other secondary multidetector, whose structure is identical to that of the main multidetector assembly, the plate of this secondary multidetector being taken to a third level of potential and the electrodes being taken to a second level of potential, the electrodes of this secondary multidetector as well as respective connections between these electrodes and secondary points outside the chamber being made on a secondary face of the electrically insulating plate, opposite the main face, these secondary connections being electrically insulated from the chamber and passing therethrough in tight manner opposite the source of X-rays, the process then consisting in respectively connecting the main and secondary connections.

3. The process of either one of claims 1 or 2, wherein the electrodes and the connections are made in the form of conducting deposits on the insulating plate.

4. The process of claim 3, wherein the conducting deposits are metallized deposits engraved on the insulating plate.

5. The process of claim 4, wherein it consists in taking each conducting plate to high voltage, making a connection between this plate and a source of high voltage outside the chamber, this connection being electrically insulated from the chamber and passing therethrough in tight manner.

6. The process of claim 5, wherein it consists in stacking a plurality of main and secondary multidetector assemblies.

* * * * *